Figure 1:
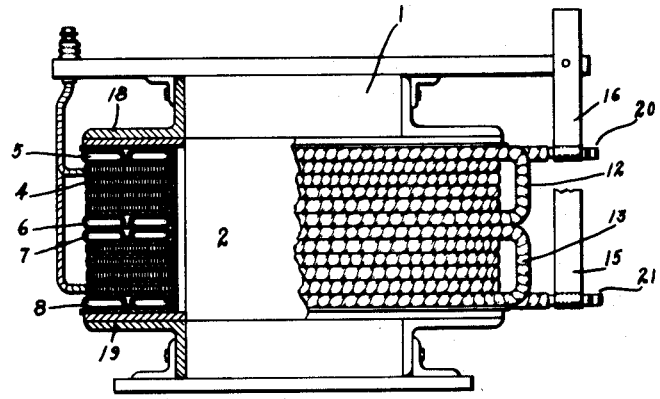

Oct. 16, 1923.

F. F. BRAND

ELECTRICAL APPARATUS

Filed May 8, 1919  2 Sheets-Sheet 1

1,471,096

Inventor:
Frederick F. Brand,
by
His Attorney.

Oct. 16, 1923.

F. F. BRAND 1,471,096

ELECTRICAL APPARATUS

Filed May 8, 1919

2 Sheets-Sheet 2

Inventor:
Frederick F. Brand,
by *Allen G. Davis*
His Attorney.

Patented Oct. 16, 1923.

1,471,096

UNITED STATES PATENT OFFICE.

FREDERICK F. BRAND, OF PITTSFIELD, MASSACHUSETTS, ASIGNOR TO GENERAL ELECTRIC COMPANY, A CORPORATION OF NEW YORK.

ELECTRICAL APPARATUS.

Application filed May 8, 1919. Serial No. 295,667.

*To all whom it may concern:*

Be it known that I, FREDERICK F. BRAND, a subject of the King of Great Britian, residing at Pittsfield, county of Berkshire, State of Massachusetts, have invented certain new and useful Improvements in Electrical Apparatus, of which the following is a specification.

My invention relates to the coaling of electrical apparatus and is particularly well adapted for cooling stationary induction apparatus of which transformers and some reactances are examples. Electrical apparatus when operating continuously generates heat, and this heat must be withdrawn from the apparatus to prevent its destruction from the high temperatures otherwise resulting. Some electrical devices, particularly those of the larger sizes and more particularly larger stationary induction apparatus generate heat so rapidly and dissipate it to the atmosphere so slowly under normal conditions, that some form of artificial cooling must be resorted to or is desirable. It is to such devices that my invention relates. One object of my invention is to provide a method of cooling electrical apparatus; speaking generally, this method consists in changing the state of a liquid within the apparatus itself in order to take advantage of the latent heat of the liquid. Latent heat is manifested for example, or more explicitly, heat is taken up by a liquid although the sensible temperature of the liquid is not raised, when the liquid evaporates, that is, changes from a liquid state to a vapor or gaseous state, when a solute is removed from a solution, etc. Another object of my invention is to provide electrical apparatus having improved cooling means. Other objects of my invention will be understood from what follows and from the appended claims.

While from a broad aspect my invention contemplates any change of state of any liquid whereby heat is absorbed during the change, I prefer in following my invention, to evaporate water within the apparatus, water being generally available and possessing other characteristics rendering it especially desirable for cooling electrical devices. I shall therefore, for the sake of simplicity, hereinafter in the further description of my invention, refer mostly to that specific part thereof embodied in the evaporation of water. The broader aspect of my invention will be understood from this description of this one specific form of my invention.

Prior to my invention electrical apparatus, and especially stationary induction apparatus, were often artificially cooled by flowing cooler water or some other fluid in good thermal relation with the apparatus. It has ever been proposed to flow cooling water through pipes contained within the apparatus itself, the pipes constituting one of the electrical windings or being solely a cooling means. By preference, I also use a hollow winding as a cooling means, as one comprising pipes, and from this aspect my invention distinguishes from the prior art in that the cooling means of my invention comprises a plurality of flat tubes conducting in parallel paths the cooling fluid or fluids contained therein, and likewise connected as multiple conductors of one of the windings of the device, the multiple tubes being disposed adjacent each other between their common terminals.

In the practice of my invention, the cooling fluid, which is preferably water, not only cools by convection as it passes through the tubular conductors, but is made to boil. In this manner the principle of latent heat is employed to accomplish a large cooling effect with a relatively small quantity of cooling fluid. This is the more evident when it is remembered that a given weight of water when evaporated takes up substantially 950 times as much heat as when the same amount of water is raised one degree Fahrenheit. Where in some cases, however, the temperature of ebullition for the cooling fluid employed is not normally reached in the electrical apparatus being cooled, I find it necessary to hasten the process of ebullition. The means which I employ to this end are set forth more fully in detail hereinafter. Where, however, in the practice of my invention the temperature of ebullition (for instance 100° C. for water) normally obtains in the operation of the apparatus special precautions must be taken to provide suitable insulation for the windings of the apparatus.

For a more complete understanding of the nature and objects of my invention, reference should be had to the following detailed description of preferred embodiments thereof, taken in connection with the accompanying drawings, in which.—

Figure 2:
Figure 4:
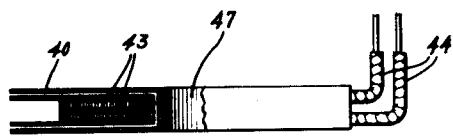
Figure 3:
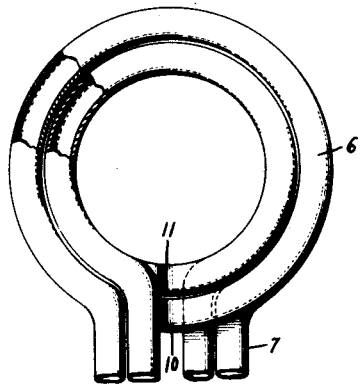
Figure 5:
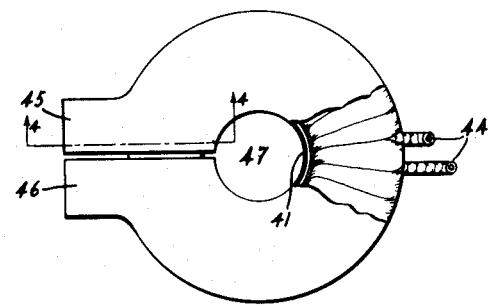
Figure 6:
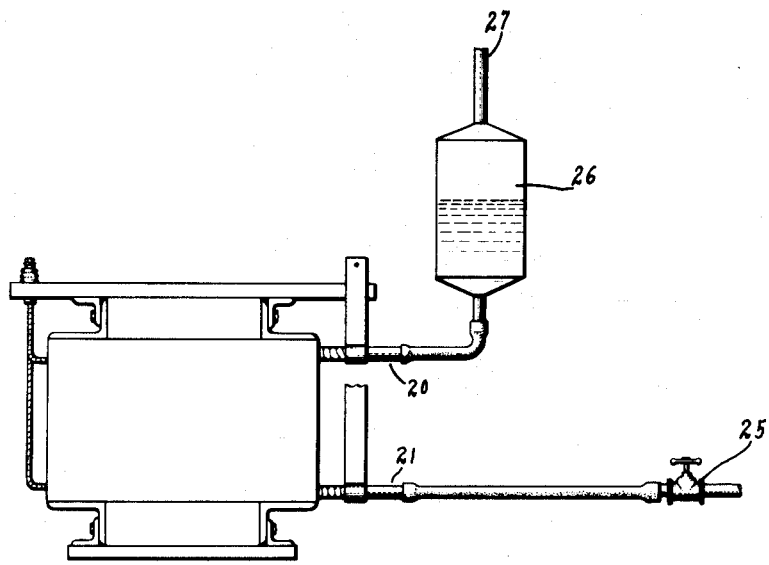

Fig. 1 is an elevation, partly in section, of a transformer embodying my invention; Figs. 2 and 3 are respectively an elevation, partly in section, and a plan view, partly in section, of a part of the low voltage, hollow, winding of the transformer of Fig. 1; Figs. 4 and 5 are respectively an elevation, partly in section, and a plan view, also partly in section, of a modification of the low voltage winding and a part of the high voltage winding of the transformer of Fig. 1, Fig. 4 being sectionalized on the line 4—4 of Fig. 5; Fig. 6 is an elevation in outline of a transformer embodying my invention showing more particularly a means for maintaining water within the transformer, and Fig. 7 is another elevation in outline, of a transformer embodying my invention illustrating a second means for introducing water into the confines of the transformer, this means being the one hereinbefore referred to as the means for hastening evaporation.

The transformer of Fig. 1 comprises a core 1 of any suitable shape, the winding leg 2 of which carries a high voltage winding consisting of a number of coils 4, and a low voltage winding consisting of four layers 5, 6, 7 and 8. Layer 6 and 7 are shown again in Figs. 2 and 3. The construction of the high voltage winding is very similar to the now common construction of high voltage windings and indeed may assume any one of a number of forms; the exact nature and construction of this high voltage winding, being immaterial to the present invention, it is no further described. Layer 5 of the low voltage winding comprises two flattened pipes disposed edge to edge and concentric with each other at one end of the coil stack. Layer 8 of the low voltage winding comprises two similar pipes similarly related. Layers 6 and 7 comprise each two similar pipes similarly located with respect to each other, these two layers, however, being disposed adjacent each other and indeed directly connected together by the connections 10 and 11 as appears best from Figs. 2 and 3. These two layers 6 and 7 are disposed about midway of the length of the coil stack and between the two halves of the high voltage winding as appears from Fig. 1. Cross-connections 12 and 13 connect the respective pipes of layers 5 and 6, and layers 7 and 8, in series, and these cross-connections and the connections 10 and 11 provide complete series conections for the inner tubes and complete series conections for the outer tubes from one end of the winding stack to the other. The two series connected sets of pipes are connected in multiple at the terminals 15 and 16 of the low voltage winding. Insulation is used between turns and between coils of the transformer substantially as shown in the drawings or in any other suitable disposition. Preferably, however, this insulation is of such material as to retain its insulating properties at temperatures of more than 100° C. Asbestos and mica, the latter both in its natural form and in the form of sheets built up of scraps of mica pasted together, are examples of insulating materials suitable for the purpose of this transformer. The high and low voltage windings of the transformer are in contact with each other as shown in the drawing in order that the heat generated in the high voltage winding may pass readily to the low voltage winding; indeed in the structure of Fig. 1, these two windings are tightly compressed together by coil clamps 18 and 19 attached to or forming parts of the core clamps.

The transformer of Fig. 1 is cooled by water passing through the hollow tubes of the layers 5, 6, 7 and 8, these tubes constituting the low voltage winding of the transformer. These tubes are provided with openings or exits adjacent the highest points thereof, namely, the points 20 of Fig. 1, and it will be noted that the upper wall or walls of this low voltage winding are, continuously, either horizontal, as within each layer, or ascending, as within the connections 10, 11, 12 and 13, so that no pockets appear in the upper walls of the winding from the lowest point 21 thereof to the highest point 20; accordingly no water vapor can be trapped within the pipes but all vapor produced readily passes to the high points 20. The hollow winding is, as it were, in the form of a spiral about a vertical axis. While such a flat multiple tube, low voltage winding is well adapted for the simple passage of cool water for cooling the transformer without evaporation in those cases where the transformer is operated at less than 100° C. (and correspondingly when the more commonly used organic insulating materials are suitable for the transformer and the more fireproof materials like mica and asbestos are not essential), this construction is particularly well adapted for those transformers to be operated at more than 100° C. In either case water is passed through the hollow low voltage winding to withdraw the heat generated in the transformer. When the transformer is operated at a temperature of 100° C. or more, the water may be admitted initially at the lowest point of the low voltage winding, namely, at point 21, and I may, as it were, maintain the hollow winding full of water as shown in Fig. 6. In this figure, water is admitted under the control of the manual valve 25 and a container 26 extends above and opens into the hollow winding at the highest point or points of the hollow winding. As the water boils in the hollow winding under the action of the temperature of 100° C. or more, the vapor escapes upwardly unhindered (as before indicated) into the container 26 and thence to the atmosphere through the exit 27. As water thus vaporizes out of the hollow winding, water flows from the container 26 back into the same and a substantially constant quantity of water is maintained within the hollow winding. At suitable intervals the supply of water in the container 26 is replenished by operation of the manual valve 25.

Figure 7:
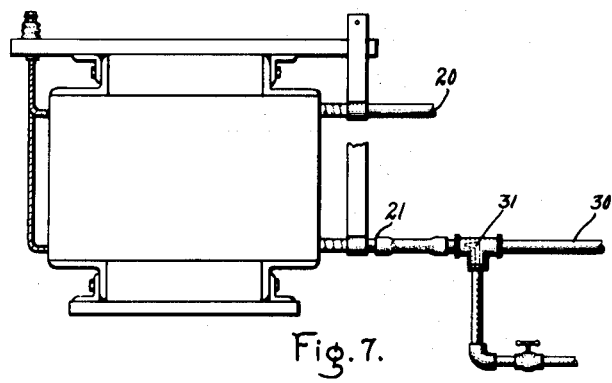

Fig. 7 illustrates a modification of the means, or a second form of means, for supplying water for evaporation in the hollow winding; this modification may be employed when the transformer is to be operated at a temperature of 100° C. or more, but is particularly designed for use when the transformer is to be operated at a temperature lower than the normal boiling point of water since this means tends to hasten the evaporation of the water. This lower temperature, while not sufficient to cause the water in the winding to boil, should be sufficient to cause such evaporation thereof that the heat absorbed by this change in the state of the water from a liquid to a gas may have an appreciable effect in cooling the transformer windings. Air is forced into the hollow winding at the point 21 through the pipe 30. Between this pipe 30 and the point 21 is provided a small nozzle 31 through which water is sprayed into the current of air from the pipe 30. The air and water spray together are forced into and through the hollow winding towards the exit 20 at the highest point thereof. The water being in the form of spray is thoroughly exposed to air, and indeed to air continuously changing, and accordingly the water rapidly vaporizes in passing through the hollow winding and most of the water leaves the exit at 20 in the form of vapor. Of course in vaporizing within the hollow winding the water extracts heat therefrom and from the whole of the transformer.

The construction illustrated in Fig. 1 is particularly designed to provide for the cooling of the high voltage winding as well as the low voltage winding by means of the water or evaporation of water, within the hollow secondary winding as has before been indicated. To this end the high voltage winding is split up into groups of a small number of coils per group, and each group of high voltage coils is disposed between layers or coils of the low voltage, hollow, cooling winding; in other words the cooling coils are in distributed relation with the high voltage winding. Hence it is that the heat developed in any high voltage coil finds a ready passage to a cooling pipe and thence passes directly into the water passing therethrough. To make this heat path still easier, the two windings are preferably tightly compressed together as before pointed out.

Figs. 4 and 5 illustrate a modification of the windings. According to this modification each low voltage coil or turn is, in half-section, of U-shape as appears at 40 in Fig. 4, and each leg and the base of the U is hollow or of two separated walls, as also appears at 40 of Fig. 4 and at 41 of Fig. 5. Contained (and tightly contained) within the hollow trough of the low voltage coil are two coils 43 of the high voltage winding. The terminals of these two coils of the high voltage winding are shown at 44. The two terminals of the coil of the low voltage winding are shown at 45 and 46 in Fig. 5. A transformer of the coil structure shown in Figs. 4 and 5, comprises one of these structures, or is built up of a number of these structures arranged about a core winding leg disposed within 47. Ends of adjacent low voltage coils are connected together in series or multiple as desired, and likewise the terminals 44 of the high voltage coils are connected together in series or multiple as desired. In addition, the passage through each low voltage coil is connected to and opens into that of another low voltage coil, or is connected directly to a water entrance and exit, in order that water may be admitted into the low voltage winding substantially as in the device of Fig. 6 or as in the device of Fig. 7, or in any other suitable way. The further assembly of the complete device from parts like Figs. 4 and 5, and the operation of transformers made up of such coil structures as are shown in these figures, are substantially like the assembly and operation of the device of Fig. 1 and need not be further described.

While I have illustrated and described in some detail the best embodiments of my invention of which I am now aware, it will be understood that these embodiments are merely illustrative of my invention and that my invention is not limited thereto but is set forth in the following claims.

What I claim as new and desire to secure by Letters Patent of the United States, is:—

1. A transformer comprising a core, a winding thereon, another winding also thereon and in distributed relation with the first mentioned winding, the second mentioned winding comprising a plurality of flat tubes connected in multiple and placed edge to edge between their common terminals, and means for supplying fluid to said tubes to be vaporized therein.

2. A transformer comprising a core, a winding thereon, another winding thereon and in distributed relation with the first mentioned winding, and means tightly compressing said windings, the second mentioned winding comprising a plurality of sets of flat tubes, the tubes of the two sets being placed edge to edge between their terminals and each set of tubes being provided with an entrance and exit.

3. A transformer comprising a core, a winding thereon, and another winding thereon and in distributed relation with the first mentioned winding and in heat conducting contact therewith, the second mentioned winding comprising a plurality of sets of flat tubes, the tubes of the two sets being placed edge to edge between their terminals and each set of tubes being provided with an entrance and exit.

4. A transformer comprising a core, a high voltage winding thereon, a low voltage winding composed of tubular conductors on the core in distributed relation with the first mentioned winding, and means connected with said conductors for injecting a water spray thereinto and entraining air therewith.

5. A transformer comprising a core, a high voltage winding thereon, a low voltage winding composed of tubular conductors on the core in distributed relation with the first mentioned winding, said conductors arranged to have continuously ascending spiral walls, and means for injecting a water spray and entraining air connected with a lower end of said tubular conductors.

In witness whereof, I have hereunto set my hand this 25th day of April, 1919.

FREDERICK F. BRAND.